(12) United States Patent
Mabuchi

(10) Patent No.: US 6,493,923 B1
(45) Date of Patent: Dec. 17, 2002

(54) METHOD FOR MANUFACTURING SMALL-SIZED MOTOR

(75) Inventor: Takaichi Mabuchi, Matsudo (JP)

(73) Assignee: Mabuchi Motor Co., Ltd. (JP)

( * ) Notice: Subject to any disclaimer, the term of this patent is extended or adjusted under 35 U.S.C. 154(b) by 0 days.

(21) Appl. No.: 09/445,834

(22) PCT Filed: Apr. 13, 1999

(86) PCT No.: PCT/JP99/01960

§ 371 (c)(1),
(2), (4) Date: Jun. 5, 2001

(30) Foreign Application Priority Data

Apr. 13, 1998 (JP) .......................................... 10-100697

(51) Int. Cl.⁷ .............................................. H02K 15/02
(52) U.S. Cl. ....................................................... 29/596
(58) Field of Search .............. 29/596, 598; 310/323.01; 464/56, 60; 403/359.6, 359.1; 408/124

(56) References Cited

U.S. PATENT DOCUMENTS 3,990,141 A * 11/1976 Stark ............................ 29/447
4,959,902 A * 10/1990 Hamilton .................. 29/898.07

FOREIGN PATENT DOCUMENTS

| JP | 56-107763 | 8/1981 |
| JP | 4-271256 | 9/1992 |
| JP | 04271256 A | 9/1992 |
| JP | 7-255153 | 10/1995 |
| JP | 07255153 A | 10/1995 |
| JP | 09163689 A | 6/1997 |
| JP | 9-163689 | 6/1997 |

* cited by examiner

Primary Examiner—S. Thomas Hughes
Assistant Examiner—Stephen Kenny
(74) Attorney, Agent, or Firm—McGlew and Tuttle, P.C.

(57) ABSTRACT

A method of the present invention for manufacturing a small-sized motor relates to cutting or grinding of a shaft end portion of a rotor into a noncircular shape over a predetermined length for establishing a mechanical coupling with a device to be driven. The cutting or grinding work is performed after a laminated core 7, a winding 6, a commutator 5, and a thrust bush 8 are assembled on a shaft 11 to thereby assemble the rotor. Alternatively, a process of cutting or grinding the shaft end portion into a noncircular shape is performed after a casing 1, an end bell 4 to be fitted to an opening portion of the casing 1, and a rotor are assembled into a small-sized motor. Thus, the present invention provides a method for manufacturing a small-sized motor in which a shaft has a D cut formed thereon, enables determination of whether or not the D cut is to be formed on the shaft, at a later stage of a motor assembly process, to thereby eliminating the need to control the stock of shafts bearing the D cut, does not involve the need to orient shafts in the same direction in preparation for press-fitting of laminated cores of rotors to the corresponding shafts, and can prevent generation of scrapings when a thrust bush is press-fitted to a shaft.

11 Claims, 3 Drawing Sheets

METHOD FOR MANUFACTURING SMALL-SIZED MOTOR

TECHNICAL FIELD

The present invention relates to a method for manufacturing a small-sized motor in which an end portion of a shaft of a rotor is machined into a noncircular shape.

BACKGROUND ART

A small-sized motor is used in various fields in order to, for example, adjust an angle of or to retract a motor-driven mirror of a car, or to drive a mechanism of a toy. In such an application, in order to establish mechanical coupling between a small-sized motor and a gear, for example, of a device to be driven, the following techniques have been used conventionally. That is, an end portion of a round shaft of the small-sized motor is machined into a noncircular shape (for example, a D shape), while a center hole of the gear for receiving the shaft is formed in a shape (for example, a D shape) corresponding to the noncircular shape of the shaft end, thereby establishing relative-rotation-prevention means. Alternatively, an inner bore of a cylindrical body for receiving the noncircular shaft end portion is formed in a circular shape, while, for example, a screw is screwed into the body from outside and perpendicular to the shaft such that an end of the screw is pressed against the noncircular portion (a flat portion of the D shape) of the shaft end, thereby establishing relative-rotation-prevention means. Conventionally, an end portion of a shaft of a small-sized motor is ground or cut into a noncircular shape before the shaft is assembled in the motor.

FIG. 5 shows a conventional shaft before assembly having a D cut 12 formed thereon so as to prevent relative rotation. In FIG. 5, reference numeral 11 denotes a shaft, and reference numeral 16 denotes an edge portion of the D cut 12. Herein, the term "D cut" refers to grinding or cutting of an end portion of a round shaft into a noncircular shape, typically, a D shape.

According to a conventional practice for forming a D cut on a shaft before assembly through grinding or cutting, about 100 shafts, for example, are fixedly arranged in a rest jig and are ground by use of a rotating grinding wheel. However, this prior art involves the following drawbacks.

- About 100 shafts are typically ground simultaneously in order to form a D cut thereon. Therefore, grinding shafts in a smaller lot in order to fulfill an order results in a higher machining cost.
- The amount of production of motors equipped with a shaft bearing a D cut must be grasped at the stage of manufacturing shafts. If customer demand should vary, the stock of shafts might increase beyond a scheduled level.
- When a laminated core is to be fitted to a shaft bearing a D cut, the laminated core is press-fitted to the shaft from an end opposite the D cut (a shaft end not bearing the D cut) in order to avoid the edge portion 16 of the D cut scraping a bore wall portion of the laminated core. Therefore, shafts to be fed to a press-fitting machine for press-fitting laminated cores to the corresponding shafts must be oriented such that shaft ends on which the D cut is formed face the same direction.
- When a thrust bush produced from brass is press-fitted to a shaft in order to axially position a rotor, the edge portion 16 of the D cut 12 scrapes a bore wall portion of the thrust bush, and scrapings adhere to the edge portion 16.

DISCLOSURE OF THE INVENTION

An object of the present invention is to provide a method for manufacturing a small-sized motor in which a D cut is formed on a shaft, which method enables determination of whether or not the D cut is to be formed on the shaft, at a later stage of a motor assembly process, thereby requiring no need to control the stock of shafts bearing the D cut.

Another object of the present invention is to eliminate the need to orient shafts in the same direction in preparation for press-fitting of laminated cores of rotors to the corresponding shafts.

Still another object of the present invention is to prevent generation of scrapings when a thrust bush is press-fitted to a shaft.

A method of the present invention for manufacturing a small-sized motor comprises a step of cutting or grinding a shaft end portion of a rotor into a noncircular shape over a predetermined length for establishing a mechanical coupling with a device to be driven, and is characterized in that the cutting or grinding work is performed after a laminated core 7, a winding 6, a commutator 5, and a strap bush 8 are assembled on a shaft 11 to thereby assemble a rotor.

A method of the present invention for manufacturing a small-sized motor is characterized in that a shaft end portion of a rotor is cut or ground into a noncircular shape for establishing a mechanical coupling with a device to be driven, after a casing 1, an end bell to be fitted to an opening of the casing 1, and a rotor are assembled into the small-sized motor.

Thus, the present invention does not involve stock control of shafts bearing a D cut, need to orient the shafts such that their D-cut ends face the same direction when laminated cores of rotors are to be press-fitted to the corresponding shafts, or generation of scrapings when thrust bushes are press-fitted to the corresponding shafts.

The shaft end portion can be cut by combined use of a punch 14 and a die 13 having a hole formed therein for receiving the shaft end portion.

The punch 14 to be used in combination with the die 13 may be stepless or may have a plurality of steps and can cut the shaft end portion in a single stroke.

BEST MODE FOR CARRYING OUT THE INVENTION

Figure 1:
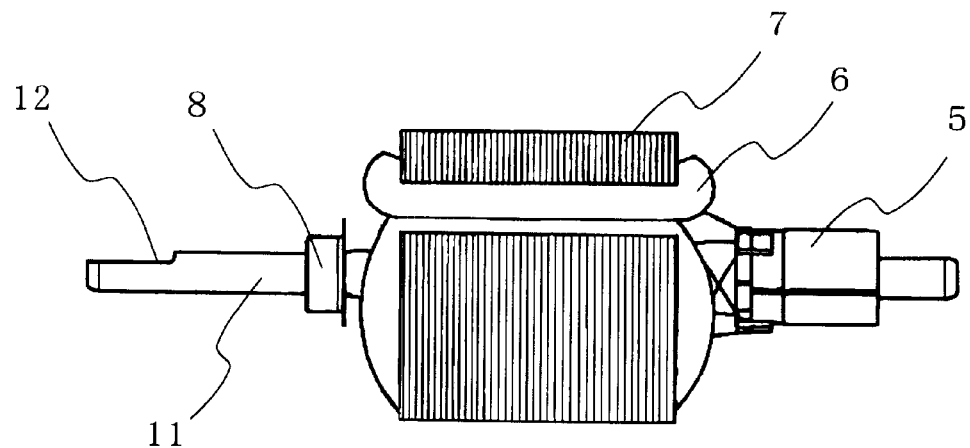
FIG. 1 is a view showing a rotor of a small-sized motor for explaining a first embodiment of the present invention in which a D cut is formed on a shaft end portion after the rotor is assembled.

Embodiments of the present invention will next be described with reference to the drawings. FIG. 1 shows a rotor of a small-sized motor and represents a first embodiment of the present invention in which a D cut is formed on a shaft end portion after the rotor is assembled. In FIG. 1, reference numeral 5 denotes a commutator; reference numeral 6 denotes a winding; reference numeral 7 denotes a laminated core for establishing magnetic poles; reference numeral 8 denotes a thrust bush produced from brass; reference numeral 11 denotes a shaft; and reference numeral 12 denotes a D cut.

The rotor is a conventional one except that the D cut 12 is formed on the shaft 11, and can be assembled according to a conventional process except that the D cut is formed. The laminated core 7 is press-fitted to the shaft 11 on which the D cut is not formed, by use of a press-fitting machine. Next, the commutator 5 is fitted to the shaft 11. Subsequently, the winding 6 is wound on the laminated core 7 to thereby form magnetic poles of the rotor. End portions of the winding are, for example, soldered or spot-welded to members extending from the corresponding commutator segments, thereby establishing electrical and mechanical connection therebetween. At the final stage of assembling the rotor, the thrust bush 8 of brass is press-fitted to the shaft 11 from an end opposite the commutator 5 to thereby position the rotor axially. At this stage, the D cut is not formed on the shaft 11; therefore, the thrust bush is not scraped. Subsequently, the D cut 12 is formed on an end portion of the shaft 11 over a predetermined length required for mechanical coupling with a device to be driven, by use of a die, which will be described later. As described above, according to the first embodiment, the D cut is formed on an end portion of the shaft 11 after the rotor is assembled.

Figure 2:
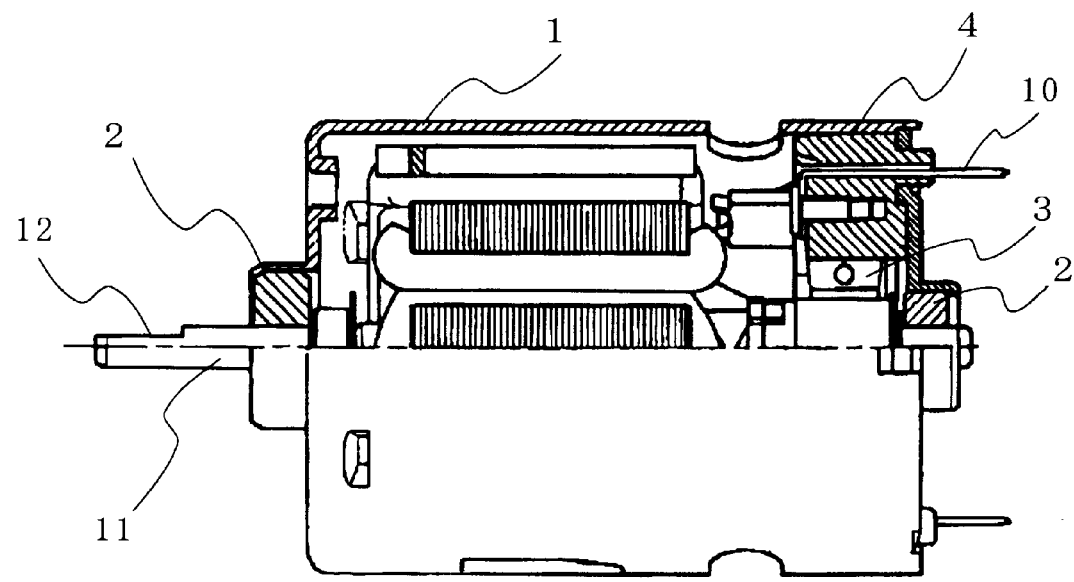
FIG. 2 is a partially sectional view showing a small-sized motor for explaining a second embodiment of the present invention in which a D cut is formed on a shaft end portion after the small-sized motor is assembled.

FIG. 2 is a view for explaining a second embodiment of the present invention. According to the second embodiment, the D cut is formed on a shaft end after a small-sized motor is assembled. In FIG. 2, reference numeral 1 denotes a casing of the small-sized motor; reference numeral 2 denotes a pair of bearings located at opposite sides of the small-sized motor and fitted to the shaft 11; reference numeral 3 denotes a brush; and reference numeral 4 denotes an end bell.

The small-sized motor of the present embodiment is a conventional one except that the D cut 12 is formed on the shaft 11, and can be assembled according to a conventional process. The casing 1 is produced from a metallic material and is formed into a closed-bottomed cylindrical shape. Permanent magnets are fixedly attached to an inner circumferential surface of the casing 1. The end bell 4 is fitted to an opening portion of the casing 1 to thereby close the casing 1. The end bell 4 is equipped with the brushes 3 and input terminals 10 connected electrically to the brushes 3. One of the paired bearings 2 is located at a bottom portion of the casing 1, while the other bearing 2 is located at a central portion of the end bell 4, thereby supporting the rotor in a rotatable manner.

The rotor is assembled in a manner similar to that for the rotor of FIG. 1. The small-sized motor is assembled according to a conventional process by use of the rotor in which the D cut is not formed on the shaft 11. Specifically, the assembled rotor is inserted into the metal casing 1 equipped with the permanent magnets through the opening portion of the casing 1 such that the shaft 11 is inserted into the bearing located at the bottom portion of the casing 1. Then, the end bell 4 equipped with the brushes 3 and the input terminals 10 is attached to the casing 1, thereby completing assembly of the small-sized motor. Subsequently, the D cut is formed on a shaft end portion over a predetermined length by use of a die as will be described later. As described above, according to the second embodiment, the D cut is formed on an end portion of the shaft 11 after the small-sized motor is assembled.

Figure 3:
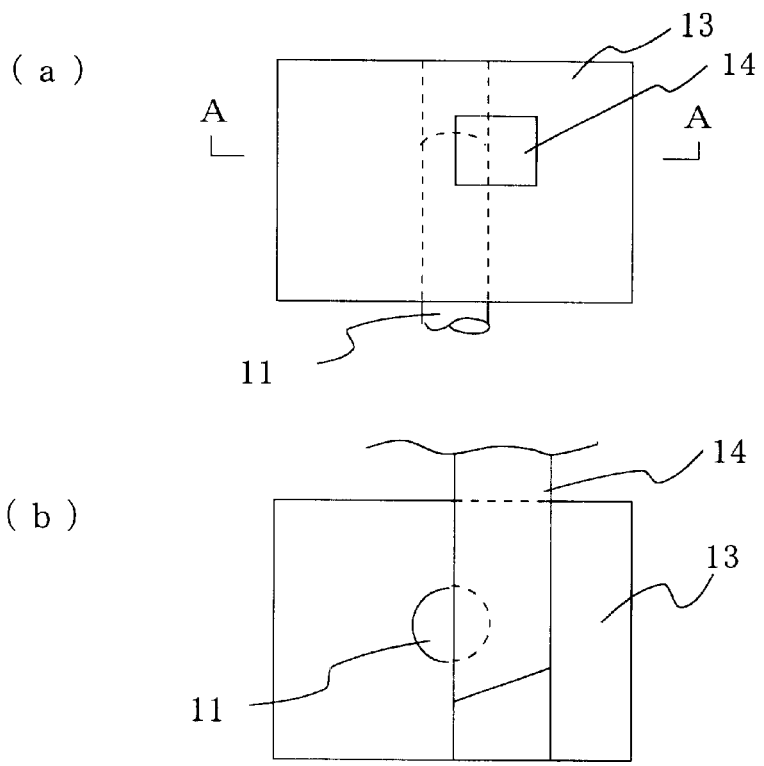
FIG. 3 is a view showing a die and a punch for explaining a method of the present invention for forming a D cut on a shaft.

FIG. 3 is a view for explaining a method of forming a D cut on the shaft by combined use of a die and a punch. FIG. 3(a) is a top view, and FIG. 3(b) is a sectional view taken along line A—A of FIG. 3(a). In FIG. 3, reference numeral 11 denotes a shaft; reference numeral 13 denotes a die; and reference numeral 14 denotes a punch.

The die 13 has a hole formed therein horizontally and adapted to receive the shaft 11. When a D cut is to be formed on the shaft 11, an end portion of the shaft 11 is inserted into the hole formed in the die 13 after the rotor is assembled as described previously with reference to FIG. 1 or after the small-sized motor is assembled as described previously with reference to FIG. 2. The shaft 11 is fixed against rotation at a portion located just outside the hole formed in the die 13.

A passage for the punch 14 is formed in the die 13 perpendicularly to the hole into which the shaft 11 is inserted. The width of the punch 14 and the position of the passage are determined such that a D cut having a predetermined length is formed on an end portion of the inserted shaft 11 in a single stroke of cutting when the punch 14 is driven downward from its upper position of stroke by, for example, hydraulic means.

Figure 4:
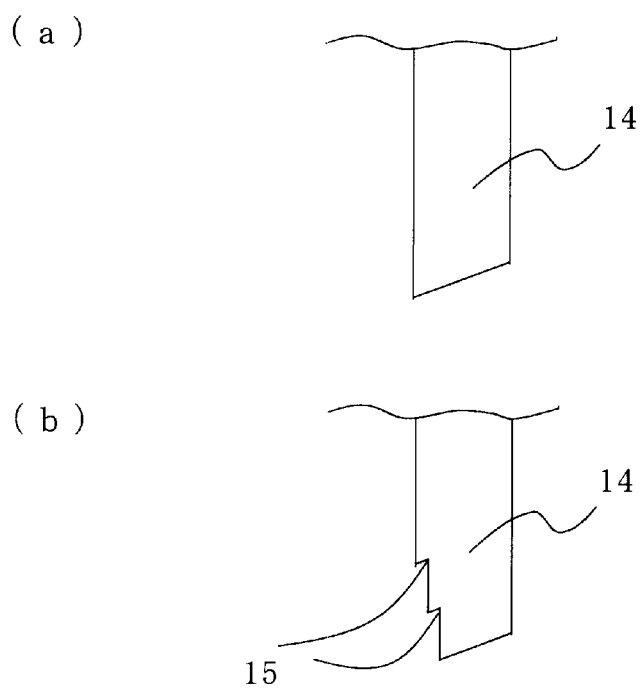
FIG. 4 is an enlarged view showing an end portion of a punch for use in cutting a D cut.
Figure 5:
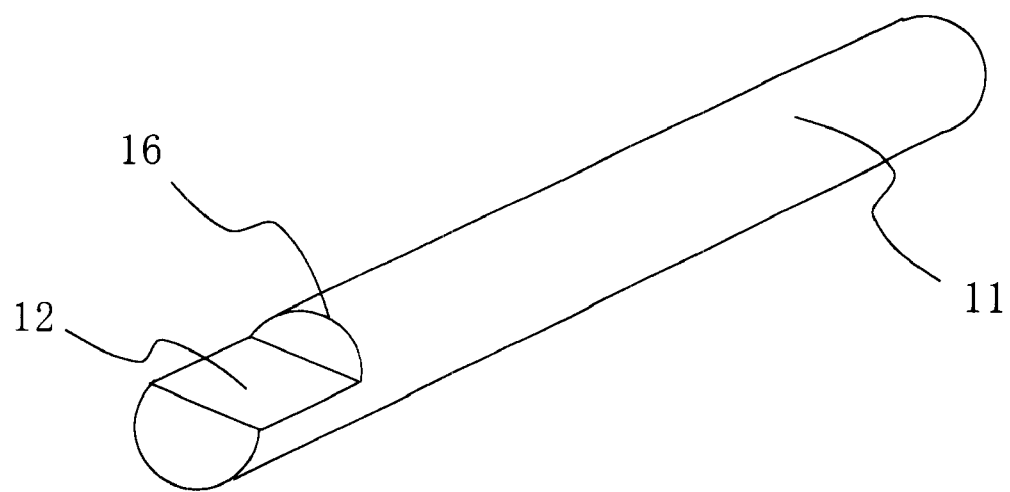
FIG. 5 is a view showing a conventional shaft before assembly having a D cut formed thereon and adapted to prevent relative rotation.

FIG. 4 is an enlarged view of an end portion of the punch 14 used to cut such a D cut. When the punch was produced from "hard metal" or "high speed steel", and a relatively soft, ferrous shaft (JIS code "SWRH82B") that contains carbon in an amount of 0.79–0.86% by weight was used, the punch was able to properly cut the shaft in a single stroke.

FIG. 4(a) shows a stepless punch, and FIG. 4(b) shows a punch having a plurality of steps 15. The stepless punch 14 is of simple structure. By contrast, being of complicated structure, the punch 14 having a plurality of steps as shown in FIG. 4(b) can cut a shaft of higher hardness.

INDUSTRIAL APPLICABILITY

As described above, according to the present invention, after a rotor or a small-sized motor is assembled, a shaft end portion of the rotor is cut or ground into a noncircular shape for establishing a mechanical coupling with a device to be driven. Accordingly, the necessity of the cutting or grinding work can be determined at the latter stage of a motor assembly process, thereby eliminating the need to control the stock of the thus-cut or -ground shafts. Also, there is no need for orienting shafts in the same direction in preparation for press-fitting of laminated cores of rotors to the corresponding shafts. Further, scrapings are not generated during press-fitting of a thrust bush to a shaft.

What is claimed is:

1. A method for manufacturing a small-sized motor equipped with a rotor in which a laminated core, a winding wound onto the laminated core, a commutator, and a thrust bush are assembled on a shaft, the method comprising the steps of:
   cutting or grinding a shaft end portion of the rotor into a noncircular shape over a predetermined length for establishing a mechanical coupling with a device to be driven; and
   prior to said step of cutting or grinding the shaft, assembling the laminated core, the winding, the commutator, and the thrust bush on the shaft to provide an assembled rotor.

2. A method for manufacturing a small-sized motor according to claim 1, wherein the shaft end portion is cut by combined use of a punch and a die having a hole formed therein for receiving the shaft end portion.

3. A method for manufacturing a small-sized motor according to claim 2, wherein the punch used in combination with the die is stepless or has a plurality of steps, and is adapted to cut the shaft end portion in a single stroke.

4. A method for manufacturing a small-sized motor, the method comprising the steps of:

assembling into a unit a rotor having a laminated core, a winding wound onto the laminated core, a commutator, and a thrust bush on a shaft;

equipping a casing having an opening portion with a magnet;

fitting a bearing to the casing;

inserting the shaft of the unit into the bearing;

forming a complete assembly by fitting an end bell equipped with brushes and another bearing to the casing and inserting the shaft of the unit into said another bearing;

subsequent to said step of forming said complete assembly, cutting or grinding a shaft end portion of the rotor into a noncircular shape over a predetermined length for establishing a mechanical coupling with a device to be driven.

5. A method for manufacturing a small-sized motor according to claim 4, wherein the shaft end portion is cut by combined use of a punch and a die having a hole formed therein for receiving the shaft end portion.

6. A method for manufacturing a small-sized motor according to claim 5, wherein the punch used in combination with the die is stepless or has a plurality of steps, and is adapted to cut the shaft end portion in a single stroke.

7. A method for manufacturing a small-sized motor comprising the steps of:

forming a rotor unit by assembling a laminated core, a winding, a commutator, and a thrust bush on a shaft, the shaft of the rotor unit having an extending shaft end portion;

providing a die having a hole formed therein for receiving the shaft end portion of the rotor unit;

inserting the shaft end portion of the rotor unit into the hole;

subsequently cutting, with a punch, the shaft end portion of the rotor unit into a noncircular shape over a predetermined length for establishing a mechanical coupling with a device to be driven.

8. A method for manufacturing a small-sized motor according to claim 7, further comprising the steps of:

equipping a casing having an opening portion with a magnet;

fitting a bearing to the casing;

inserting the shaft of the rotor unit into the bearing;

forming a complete assembly by fitting an end bell equipped with brushes and another bearing to the casing and inserting the shaft of the unit into said another bearing, wherein said step of inserting the shaft end portion of the rotor unit into the hole takes place after said step of forming a complete assembly.

9. A method for manufacturing a small-sized motor according to claim 8, wherein the shaft end portion is cut by a punch while said shaft end portion of the rotor unit is inserted into the hole of the die.

10. A method for manufacturing a small-sized motor according to claim 9, wherein the punch used in combination with the die is stepless and is adapted to cut the shaft end portion in a single stroke.

11. A method for manufacturing a small-sized motor according to claim 9, wherein the punch used in combination with the die has a plurality of steps, and is adapted to cut the shaft end portion in a single stroke.

* * * * *